United States Patent
Halmos et al.

(10) Patent No.: US 7,345,744 B2
(45) Date of Patent: Mar. 18, 2008

(54) OPTICAL DELAY LINE TO CORRECT PHASE ERRORS IN COHERENT LADAR

(75) Inventors: Maurice J. Halmos, Encino, CA (US); Matthew J. Klotz, Pasadena, CA (US); Jean-Paul Bulot, Redondo Beach, CA (US)

(73) Assignee: Raytheon Company, Waltham, MA (US)

(*) Notice: Subject to any disclaimer, the term of this patent is extended or adjusted under 35 U.S.C. 154(b) by 117 days.

(21) Appl. No.: 11/091,152

(22) Filed: Jun. 6, 2005

(65) Prior Publication Data
US 2006/0279723 A1    Dec. 14, 2006

(51) Int. Cl.
G01C 3/08    (2006.01)
(52) U.S. Cl. .................... 356/5.1; 356/5.15
(58) Field of Classification Search ........... 356/5.15
See application file for complete search history.

(56) References Cited

U.S. PATENT DOCUMENTS

| | | | |
|---|---|---|---|
| 4,521,107 A * | 6/1985 | Chaborski et al. | 356/5.06 |
| 5,585,913 A | 12/1996 | Haiharan et al. | |
| 5,847,816 A * | 12/1998 | Zediker et al. | 356/5.09 |
| 5,847,817 A | 12/1998 | Zediker et al. | |
| 6,469,778 B2 * | 10/2002 | Asaka et al. | 356/28.5 |
| 6,559,932 B1 | 5/2003 | Halmos | |
| 6,608,307 B1 * | 8/2003 | Baur | 250/306 |
| 2006/0011840 A1 * | 1/2006 | Bryce et al. | 250/338.5 |

FOREIGN PATENT DOCUMENTS

| | | |
|---|---|---|
| EP | 0 947 834 | 10/1999 |
| EP | 1 118876 | 7/2001 |
| WO | WO 99/06853 | 2/1999 |
| WO | WO 2004025324 | 3/2004 |

* cited by examiner

Primary Examiner—Thomas H. Tarcza
Assistant Examiner—Timothy Brainard
(74) Attorney, Agent, or Firm—Leonard A. Alkov

(57) ABSTRACT

A ladar system with phase correction. The novel ladar system includes optics for receiving a first signal that is a reflected version of a transmitted laser signal, an optical delay line for providing a second signal that is a delayed version of the transmitted laser signal, and a mechanism for mixing the first signal with the second signal. The second signal is delayed by a time $T_D$ that reduces a relative time difference between the first and second signals such that phase errors caused by laser transmitter instabilities and nonlinear modulation are less than a predetermined level.

11 Claims, 2 Drawing Sheets

OPTICAL DELAY LINE TO CORRECT PHASE ERRORS IN COHERENT LADAR

BACKGROUND OF THE INVENTION

1. Field of the Invention

The present invention relates to ladar systems. More specifically, the present invention relates to systems and methods for correcting phase errors in coherent ladar systems.

2. Description of the Related Art

Coherent ladar applications and techniques are beginning to be considered for various applications including commercial and military. These include high resolution velocity measurements, remote vibration measurements, optical synthetic aperture implementations, and others. High resolution coherent ladars typically require very stable laser oscillators and well controlled modulation waveforms. However, the increasing demand for fidelity, resolution, and long range of operation make the component requirements impossible to meet using conventional ladar systems.

A ladar system typically includes a laser transmitter that produces a laser signal which is transmitted towards a target scene. The laser signal reflects off the target, producing a laser return that is subsequently detected by the ladar system. The intensity of the return signal and the round trip delay from transmission to detection yield the distance (range) to the target. Coherent ladar systems transmit a laser signal having a predetermined phase and frequency. Knowledge of the spectral characteristics of the transmitted signal enables coherent ladar systems to record additional information about the scene, such as target movement. The velocity of a target can be determined from the frequency spectrum of the laser return.

A coherent ladar system typically includes a receiver detector that is illuminated by the laser return and a local oscillator (LO) reference signal. The mixing of the laser return with an LO signal allows the system to sense the phase and frequency of the return signal and also to amplify it to maintain the signal-to-noiseratio (SNR) of the return. The detector outputs a cross product of the laser return and LO optical fields. The desired information about the target is contained in the portion of the detector's output that oscillates at the frequency difference between the LO reference signal and the laser return.

In order to obtain high fidelity information, particularly in high coherence systems such as vibration sensitivity or Doppler sensitivity for synthetic aperture, the quality or fidelity of the transmitted signal must be very high. Laser transmitters, as other transmitters, tend to drift frequency in time, creating a limitation on the signal fidelity that can be achieved. In addition, large time-bandwidth modulated transmitted waveforms also require a high degree of phase control and ultimately also limit the return signal fidelity that can be achieved. Conventional ladar systems cannot meet the component stability requirements (laser transmitter stability and modulator linearity) necessary for high fidelity, high resolution, long range applications.

Hence, a need exists in the art for an improved ladar system having reduced component stability requirements than prior ladar systems.

SUMMARY OF THE INVENTION

The need in the art is addressed by the ladar system of the present invention. The novel ladar system includes optics for receiving a first signal that is a reflected version of a transmitted laser signal, an optical delay line for providing a second signal that is a delayed version of the transmitted laser signal, and a mechanism for mixing the first signal with the second signal. The second signal is delayed by a time $T_D$ that reduces a relative time difference between the first and second signals such that phase errors caused by laser transmitter instabilities and nonlinear modulation are less than a predetermined level.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
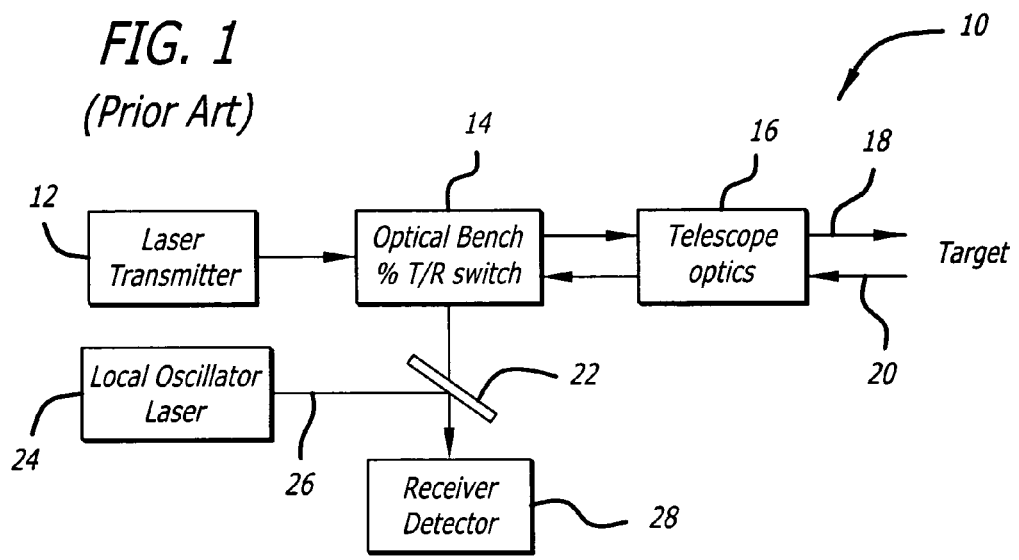
FIG. 1 is a simplified block diagram of a conventional coherent ladar system employing heterodyne detection.

FIG. 1 is a simplified block diagram of a conventional coherent ladar system 10 employing heterodyne detection. The ladar system 10 includes a laser transmitter 12 that generates a laser signal, and an optical bench 14 adapted to direct the laser signal to telescope optics 16, which transmit the laser signal 18 towards a target and receive a laser return signal 20 from the target. The optical bench 14 directs the laser return signal towards a beam splitter 22, which mixes the laser return signal with a local oscillator (LO) signal 26 generated by an LO laser 24. A receiver detector 28 then detects the mixed signal.

The detector current $i_{sig}$ is proportional to the product of the return signal power $P_r$, the LO power $P_{LO}$, and the detector responsivity $\mathcal{R}$, as given by the equation $i_{sig}^2 = \mathcal{R}^2 \cdot 2 P_r P_{LO}$. As such, the signal will fluctuate at the difference frequency of both optical signals and be sensitive to the difference in phase.

Heterodyne Detection Mathematics

Assume the electromagnetic electric field of a signal is given by, $A(t)\sin[\omega t+\phi_a(t)]$, and that of the LO by, $B\sin[\omega' t+\phi_b(t)]$. Combining the two fields yields the sum: $A(t)\sin \omega t + B \sin \omega' t$. The optical detector response current $i_{sig}$ is sensitive to the square of the electric field (proportional to the optical power) yielding a signal (ignoring for now the phase terms):

$$i_{sig} = A(t)^2 \sin^2 \omega t + B^2 \sin^2 \omega' t + A(t)B[\cos(\omega-\omega')t - \cos(\omega+\omega')t] \quad [1]$$

Typically, the LO power (B) is orders of magnitude larger than the received signal (A), so the detector only sees the continuous LO power and the oscillating part of the LO mixing with the signal power. The oscillations are only at the difference frequency, $\omega_r = \omega - \omega'$, where the summed frequency, $\omega + \omega'$, is out of band from the detector material response. The LO component is a DC term and contributes to the shot noise calculations. The signal being sought at the detector is then given by (now including the phase terms):

$$i_{sig} = A(t)B \cos\{\omega_r t + [\phi_a(t) - \phi_b(t)]\} \quad [2]$$

Assuming that the signal is supposed to be just a tone at frequency $\omega_r$, corresponding to the optical frequency difference of the return signal to the LO frequency, then the residual phase change in time is then phase error $\phi_e(t)$:

$$\phi_e(t) = \phi_a(t) - \phi_b(t) \quad [3]$$

Assuming the transmitter and LO lasers are independent (no phase coupling between them), the power spectrum $S_{\phi e}(\omega)$ would be given by:

$$S_{\phi e}(\omega) = S_{\phi a}(\omega) + S_{\phi b}(\omega) \quad [4]$$

where the definition of the power spectrum $S_\phi$ is given by:

$$S_\phi = \left| \frac{1}{T} \int_{-T/2}^{+T/2} \phi(t) e^{-j\omega t} \cdot dt \right|^2 \quad [5]$$

for a large period T.

If the laser sources of the transmitter and LO are similar, then their phase power spectrum would be approximately the same, yielding:

$$S_{\phi e}(\omega) = 2 \cdot S_{\phi a}(\omega) \quad [6]$$

On the other hand, if the LO is a perfect laser with no phase noise then the receive signal would only be affected by the transmitter phase noise yielding a power spectrum of:

$$S_{\phi e}(\omega) = S_{\phi a}(\omega) \quad [7]$$

In an ideal situation, the phase drift of the transmitter and LO optical signals is negligible and represents only a fixed phase offset. However, in high coherence systems, such as synthetic aperture ladar (SAL) or micro-Doppler vibration sensors, this is not the case. As a matter of fact, random phase drifts in a long enough period of time will destroy the signal coherence, limiting the fidelity of the ladar.

Phase Noise Limitations and Frequency Stability

Regardless of the specific coherent application, SAL or micro-Doppler, the rms (root mean squared) phase error that can be tolerated, $\phi_o$, is usually a fraction of $2\pi$ such as $\pi/30$. The rms value of a random phase increases as a function of time (random walk statistics), therefore the coherent measuring time, $T_{coh}$, plays an important role in determining the laser phase requirements. For some recent SAL applications, the coherent measuring time $T_{coh}$ was in the order of 5 ms.

One of the first questions that needs to be addressed in a coherent ladar, is what the frequency stability of the laser(s) should be in order to meet the phase noise requirement of $\phi_o$ during the coherent measuring time. The signal frequency is defined as:

$$2\pi f(t) \equiv \frac{d}{dt}\phi(t) \quad [8]$$

The power spectrum of the frequency distribution as a function of the phase distribution is given by:

$$S_f(\omega) = \omega^2 \cdot S_\phi(\omega) \quad [9]$$

The linewidth of a laser is defined as one standard deviation (in radians) given by:

$$(2\pi \cdot \Delta f)^2 \equiv \sigma_f^2 = \frac{1}{2\pi} \int_{-\infty}^{\infty} S_f(\omega) d\omega \quad [10]$$

The rms phase error is then given by:

$$\phi_o^2 \equiv \sigma_\phi^2 = \frac{1}{2\pi} \int_{-\infty}^{\infty} S_\phi(\omega) d\omega \quad [11]$$

However, the phase error of interest is only the rms phase error during the coherent measuring time and only due to phase changes during that time. The average constant phase does not affect the signal, only the changes from that average. The average phase during a period T, is calculated by:

$$\bar{\phi}(t) = \frac{1}{T} \int_{t-T/2}^{t+T/2} \phi(\alpha) \cdot d\alpha \quad [12]$$

The operation of averaging over an interval T is called smoothing, and it can be shown that $\bar{\phi}(t)$ is obtained as the output of a linear system with $\phi(t)$ as the input and an impulse response $h(t)$ of a rectangular pulse:

$$\bar{\phi}(t) = \phi(t) \otimes h(t) \quad [13]$$

where:

$$h(t) = \begin{cases} 1/T & |t| < T/2 \\ 0 & |t| > T/2 \end{cases} \quad [14]$$

and in the frequency domain:

$$H(j\omega) = \frac{\sin(\omega T/2)}{(\omega T/2)} \quad [15]$$

The power spectrum of the smoothed signal is then given by the expression:

$$S_{\bar{\phi}}(\omega) = S_\phi(\omega) \cdot \frac{\sin^2(\omega T/2)}{(\omega T/2)^2} \quad [16]$$

In practice, the average or phase offset is not of concern, only the phase change during the coherent measuring time.

As such, the phase noise of interest is the rms deviation from the average phase, given by $y(t)=\phi(t)-\bar{\phi}(t)$. The power spectrum for this phase error is then given by the expression:

$$S_y(\omega) = S_\phi(\omega) - S_{\bar{\phi}}(\omega) \quad [17]$$

$$= S_\phi(\omega) - S_\phi(\omega) \cdot \frac{\sin^2(\omega T/2)}{(\omega T/2)^2}$$

$$= S_\phi(\omega) \cdot \left(1 - \frac{\sin^2(\omega T/2)}{(\omega T/2)^2}\right)$$

The term in parentheses acts as a highpass filter, indicating that static or slow changes in phase have diminished consequence.

Often the significant contribution occurs only at frequencies below the coherent integration time T. For this case, Eqn. 17 can be simplified to:

$$S_y(\omega) = S_\phi(\omega) \cdot \frac{1}{3}(\omega T/2)^2 \quad [18]$$

for $$\omega T/2 \ll 1$$

The rms phase error is then given by:

$$\sigma_y^2 = \frac{1}{2\pi}\int_{-\infty}^{\infty} S_y(\omega) d\omega = \frac{1}{2\pi}\int_{-\infty}^{\infty} S_\phi(\omega) \cdot \frac{1}{3}(\omega T/2)^2 d\omega \quad [19]$$

$$= \frac{T^2}{12}\frac{1}{2\pi}\int_{-\infty}^{\infty} S_f(\omega) d\omega = \frac{T^2}{12}\cdot \sigma_f^2 = \frac{(T\cdot 2\pi \Delta f)^2}{12}$$

where Eqns. 9 and 10 were used to replace in $S_f(\omega)$ and $\Delta f$. Solving for the required linewidth results in:

$$\Delta f = \frac{\sigma_y}{2\pi T}\cdot 2\sqrt{3} \quad [20]$$

This is the combined laser linewidth for the ladar system. Assuming two separate lasers, one for the LO and one for the transmitter, and assuming that both lasers have the same linewidth noise mechanism (same linewidth), then each individual laser requires a linewidth of:

$$\Delta f_L = \frac{\sigma_y}{2\pi T}\cdot \sqrt{6} \quad [21]$$

As a numerical example, given a target value of phase noise $\sigma_y=\pi/30$, and an integration time of T=5 ms, the laser linewidth requirement would be, $\Delta f_L=8$ Hz, when the LO and transmitter have similar phase noise, and $\Delta f_L=15$ Hz, when the LO is ideal with no phase noise. Both of those frequency stabilities are very difficult small values to achieve, especially in a field environment. Most stable fiber lasers are in the range of 5-15 kHz.

Approaches for Reducing Linewidth Requirements

An obvious step one takes when trying to reduce the laser coherence or linewidth requirements is to switch from a heterodyne configuration (two lasers) to a homodyne configuration (a single laser). There are a number of benefits (from a coherence point of view) to using a single master oscillator (MO) laser for both the transmitter and the local oscillator (LO) lasers. Using a single MO, however, requires that the optical modulation required to obtain the desired waveform be done external to the laser resonator. This limits the laser sources (and wavelengths) to the availability of appropriate modulators.

Single Master Oscillator, MO, for Transmitter and LO Laser

Figure 2:
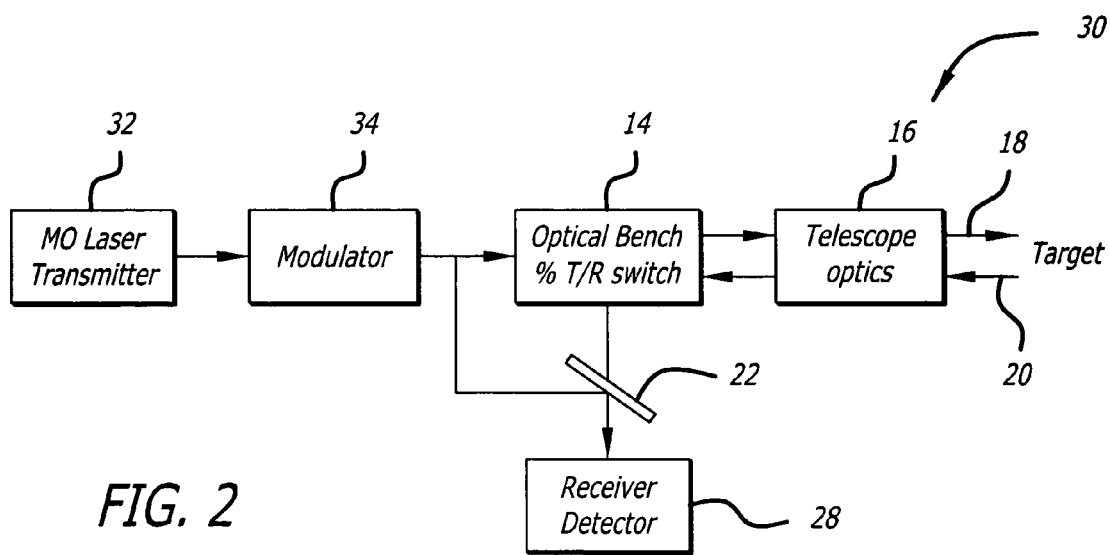
FIG. 2 is a simplified block diagram of a conventional coherent ladar system employing homodyne detection.

FIG. 2 is a simplified block diagram of a conventional coherent ladar system 30 employing homodyne detection. The ladar system 30 is identical to that shown in FIG. 1 except that the separate laser transmitter and LO laser of FIG. 1 are replaced by a single MO laser 32, the output of which may be modulated by an external modulator 34. The output of the modulator 34 is split: one signal is transmitted to the target via the optical bench 14 and telescope optics 16, and the second signal acts as the LO reference signal and is mixed with the laser return signal by the beam splitter 22.

If both the transmitted signal and the LO signal are derived from a single master oscillator laser, then the phase error term of the signal in Eqn. 3 becomes $$\phi_e(t)=\phi_a(t+\tau_0)-\phi_a(t) \quad [22]$$

where $\tau_0$ is the time difference between the two beams to reach the receiver detector. Often the time difference is mainly the round-trip time of the laser to the target given by 2R/c where R is the range distance and c is the speed of light. In this case, the two phase terms are dependent on each other, where changes in phase slower than the time difference $\tau_0$, would tend to largely cancel out.

The power spectrum of the difference phase terms can be derived using the relations of autocorrelation, $R(\tau)$ and power spectrum $S(\omega)$ given:

$$\begin{bmatrix} x(t) & R(\tau) & S(\omega) \\ \hline a\cdot x(t) & (|a|)^2\cdot R(\tau) & (|a|)^2\cdot S(\omega) \\ \frac{d}{dt}x(t) & \frac{d^2}{d\tau^2}R(\tau) & \omega^2 S(\omega) \\ \blacksquare & R(\tau+\tau_0) & S(\omega)e^{-j\omega\tau_0} \end{bmatrix} \quad [23]$$

Applying properties, the autocorrelation and power spectrum functions of the phase error are obtained as follows:

$$R_{\omega e}(\tau):=E(\phi e(t)\cdot\phi e(t+\tau))$$

$$R_{\omega e}(\tau):=E[(\phi a(t+\tau_0+\tau)-\phi a(t+\tau))\cdot(\phi a(t+\tau_0)-\phi a(t))]$$

$$R_{\phi e}(\tau):=E[\phi a(t+\tau_0+\tau)\cdot\phi a(t+\tau_0)-\phi a(t+\tau_0+\tau)\cdot\phi a(t)-(\phi a(t+\tau)\cdot\phi a(t+\tau_0)+\phi a(t+\tau)\cdot\phi a(t))]$$

$$R_{\phi e}(\tau):=2R_{\phi a}(\tau)-(R_{\phi a}(\tau-\tau_0)+R_{\phi a}(\tau+\tau_0))$$

$$S_{\phi e}(\omega):=2\cdot S_{\phi a}(\omega)-(S_{\phi a}(f)\cdot e^{j\cdot\omega\cdot\tau_0}+S_{\phi a}(f)\cdot e^{-j\cdot\omega\tau_0})$$

Yielding the final relation:

$$S_{\phi e}(\omega):=4\cdot S_{\phi a}(\omega)\left(\sin\left(\omega\cdot\frac{\tau_0}{2}\right)\right)^2 \quad [24]$$

Using Eqn. 24, the power spectrum of the received phase error, $\phi_e$, can be calculated from the phase drift, $\phi_a$, of the master oscillator.

Note that the power spectrum of the differential phase $\phi_e(t)$ is the power spectrum of the MO laser $\phi_a(t)$ multiplied by a filter function of $4*\sin(\omega\tau_0/2)^2$, which has the general shape of a highpass filter. Thus, as expected, the phase changes that occur at times slower than $\tau_0$ (low frequencies) are largely attenuated.

The phase error during the coherent integration time of the ladar can be calculated by using the additional dependence of Eqn. (17) and expanding to:

$$S_y(\omega) = S_\phi(\omega) \cdot \left(1 - \frac{\sin^2(\omega T/2)}{(\omega T/2)^2}\right) \quad [25]$$

$$= S_{\phi a}(\omega) \cdot \left(1 - \frac{\sin^2(\omega T/2)}{(\omega T/2)^2}\right) \cdot 4\sin^2(\omega\tau_0/2)$$

Eqn. 25 now has two filter functions that reduce the effect of phase noise when it occurs at low frequencies (slow changing phase). The term in parentheses is due to the coherent measuring time, T, and rolls off at a frequency~1/T. The second term, to the right of the parenthesis, is due to the time difference, $\tau_0$, between the LO and return signal and rolls off at a frequency~$1/\tau_0$.

Typically, the coherent measuring time that is needed is much longer that the delay between the transmitter and the LO, which is determined by the range delay. Since typically T is relatively long, a conservative assumption can be made that the term in parentheses is unit for most of the significant phase noise frequencies.

However, for any coherent system to work, the high frequency phase noise terms (usually due to acoustics) must be kept under control. In order for the total integrated phase noise to be small, it is required that $\omega\tau_0/2 \ll 1$. This simplifies Eqn. 25 to:

$$S_y(\omega) = S_{\phi a}(\omega) \cdot (\omega\tau_0)^2 \quad [26]$$

Solving again for the relevant rms phase noise, $\sigma_y$, from Eqn. 19 yields:

$$\sigma_y^2 = \frac{1}{2\pi}\int_{-\infty}^{\infty} S_y(\omega)d\omega = \frac{1}{2\pi}\int_{-\infty}^{\infty} S_{\phi a}(\omega) \cdot (\omega\tau_0)^2 d\omega \quad [27]$$

$$= \tau_0^2 \frac{1}{2\pi}\int_{-\infty}^{\infty} S_f(\omega)d\omega = \tau_0^2 \cdot \sigma_f^2 = (\tau_0 \cdot 2\pi\Delta f)^2$$

Solving for the frequency stability of the laser yields:

$$\Delta f_L = \frac{\sigma_y}{2\pi\tau_0} \quad [28]$$

which is similar to Eqn. 21, but now independent of the coherent measuring time, T.

As a numerical example, if an application requires a measuring time of 5 ms with a phase error $\sigma_y$ of less than $\pi/30$, and operates at a range of 15 km, then $\tau_0$ is 100 µs, yielding a linewidth requirement of:

$$\Delta f_L = 167 \text{ Hz} \quad [29]$$

This is a great improvement over the value of 8 Hz obtained in the previous example from Eqn. 21, but still a usually difficult goal to achieve. In addition, if the range of operation is increased by a factor of 10 to 150 km, then the frequency stability requirement would again become a very difficult to achieve 17 Hz.

Concept for the Invention: Optical Delay Line Reference to Reduce Laser Stability Requirement Often, the coherent sensor needs to perform in a stressing scenario, where the coherent processing times are relatively long (multi-milliseconds) for high fidelity, and distances to the target are long, yielding delay times of 100's of microseconds. The example calculation above using Eqn. 28 that matches this scenario shows that the laser frequency stability is a difficult to achieve, small value in the 100 Hz.

To loosen the frequency stability requirement of the laser, $\Delta f_L$, to be a larger, more achievable value (around 10 kHz), it would be desirable to reduce the relative delay value of $\tau_0$ from greater than 100 µs to about 1-2 µs. Reducing the distance of the sensor to the target would reduce $\tau_0$, but would not be an operational acceptable solution since long range operation is what is usually the ultimate goal. The relative time difference $\tau_0$ of the received and LO signal can also be reduced by using an optical delay line to delay the LO reference by an amount similar to the transmit target time.

Figure 3:
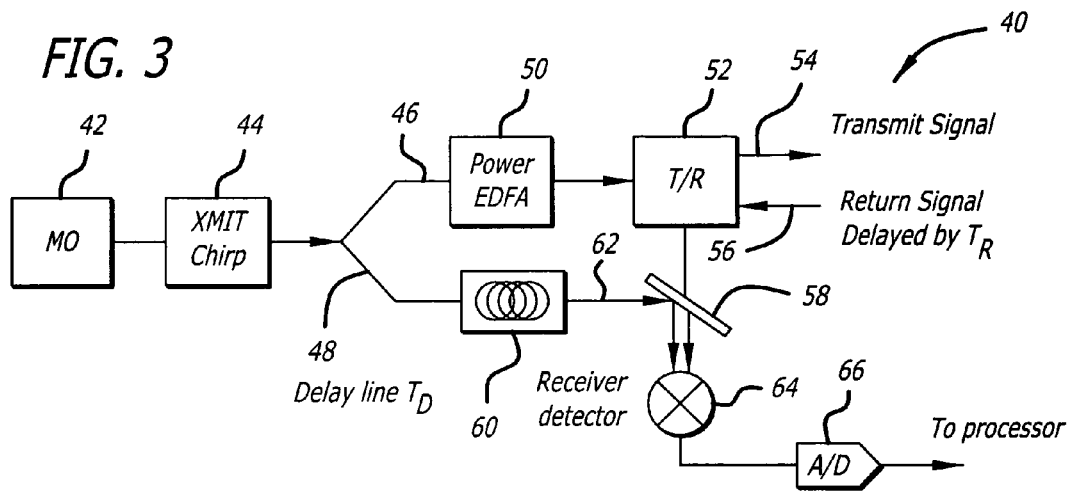
FIG. 3 is a simplified block diagram of an illustrative embodiment of a coherent ladar system designed in accordance with the teachings of the present invention.

FIG. 3 is a simplified block diagram of an illustrative embodiment of a coherent ladar system 40 designed in accordance with the teachings of the present invention. The ladar system 40 is in a homodyne configuration having a single master oscillator laser transmitter 42. The system 40 may optionally include a waveform modulator 44 adapted to modulate the signal generated by the MO laser 42. In the illustrative embodiment, the system uses a linear frequency modulated (LFM) chirp waveform. Other modulation schemes (including no modulation) can also be used without departing from the scope of the present teachings. The output of the modulator 44 is split into two signals: a first signal 46 to be used for transmission to the target, and a second signal 48 to be used as an LO or reference signal. In the illustrative embodiment, the first signal 46 is amplified by a power amplifier 50 (an erbium doped fiber amplifier is shown in FIG. 3) and transmitted towards a target by transmit/receive optics 52. The transmitted signal 54 reflects off the target, generating a laser return signal 56, which is received by the transmit/receive optics 52 after a round trip time of $T_R$ and directed towards a beam splitter 58.

In accordance with the teachings of the present invention, the laser return is mixed with an LO reference signal that has been delayed by an amount similar to the transmit target time, in order to reduce the relative time difference $\tau_0$ between the received and the LO signal. In the illustrative embodiment of FIG. 3, the delay is accomplished using an optical delay line 60. The second signal 48 output from the MO laser 42 and modulator 44 is input to the optical delay line 60, which delays the signal by an amount $T_D$ similar to the round trip time $T_R$ to the target. The delayed reference signal 62 is then combined with the laser return by the beam splitter 58 and detected by a receiver detector 64. The detected signal can then be converted to digital by an analog to digital converter (A/D) 66 and sent to a processor.

By using a delay as such, a relative delay $\tau_0$ of less then 1 µs (150 m range) can be achieved. The frequency stability requirement from Eqn. 28 would then become:

$$\Delta f_L = 16.7 \text{ kHz} \quad [30]$$

which is now readily realizable with fiber oscillators.

The optical architecture shown in FIG. 3 reduces not only the laser stability requirement, but also the chirp linearity requirements for a ladar using a stretch processing approach.

A linear FM (LFM) chirp waveform is used for obtaining high bandwidth (bandwidth of the chirp) and long coherence for large time-bandwidth product waveforms. Given a desired down-range resolution of Xres, the chirp bandwidth should be c/(2*Xres), where c is the speed of light. The return signal is mixed with the LO signal, which also consists of a chirp, yielding a single tone whose frequency is a function of the relative delay. This waveform allows for stretch processing that reduces the bandwidth of the receiver and A/D.

Figure 4:
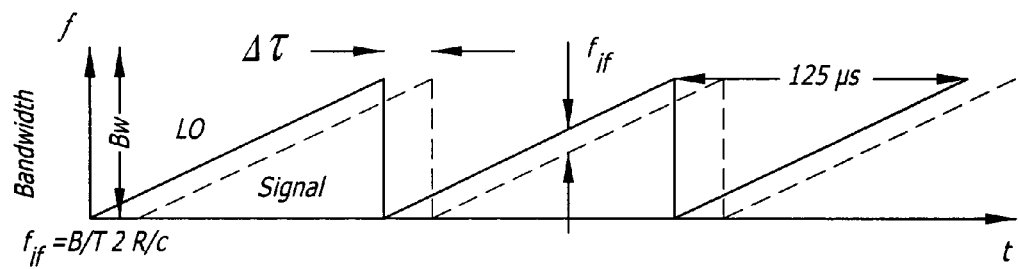
FIG. 4 is a graph of a received signal and LO signal using a linear FM chirp waveform.

FIG. 4 is a graph of a received signal and LO signal using a linear FM chirp waveform. A problem with using a chirp waveform is that modulators are not perfectly linear, resulting in additional phase errors.

The phase of a LFM chirp waveform is given by:

$$\theta(t) = \omega t + \frac{\mu}{2}t^2 + \phi(t) \quad [31]$$

where the first term is the optical frequency, the second term is the linear FM chirp with slope $\mu$, and the final term is the remaining phase change due to both the nonlinear modulation and the residual laser phase instability.

Mixing the return signal with a receiver LO derived from the transmitted signal results in the operation given by Eqn. 22:

$$\theta(t+\tau_0) - \theta(t) = \omega(t+\tau_0) + \frac{\mu}{2}(t+\tau_0)^2 + \quad [32]$$
$$\phi(t+\tau_0) - \omega t - \frac{\mu}{2}t^2 - \phi(t)$$
$$= (\mu\tau_0)t + [\phi(t+\tau_0) - \phi(t)] + \left[\omega\tau_0 + \frac{\mu}{2}\tau_0^2\right]$$

The first term represents the RF tone proportional to the range delay $\tau_0$, the second term in brackets is the phase noise due to random changing phase due to nonlinear chirping and MO phase noise, and the third bracketed term is a dc phase term that does not influence the signal extraction. Note that the phase deviation due to non-linear chirp is indistinguishable from the MO phase noise, and as such, is also reduced by the reduction of the relative delay $\tau_0$. If the optical delay of the LO matches the range delay exactly, $\tau_0$ becomes zero and the phase error term vanishes. In order to meet a phase error of $\sigma_y \sim \pi/30$, the rms frequency error during the chirp must be (without self referencing the receiver):

$$\frac{\delta f}{f} \leq \frac{\sigma_y}{2\pi} \cdot \frac{1}{BT} \quad [33]$$

A typical demanding waveform would have a time-bandwidth product (BT) of over 100,000. Evaluating the chirp driver requirement of Eqn. 33 results in: $\delta f/f < 1.5 \times 10^{-7}$, which is a very difficult number to meet.

By using the optical delay to self-reference or mix the return signal with itself, the T in Eqn. 33 is replaced by $\tau_0$. As $\tau_0$ is reduced by matching the optical delay to the round trip to target delay, $\delta f/f$ rapidly increases to achievable values.

Refinement of Invention: Separation of Local Oscillator and Error Correction Functions Imposing a long delay line (such as fiber optic) to the LO reference path could have detrimental implementation consequences. The amount of power needed to efficiently implement the coherent receiver is greater than a long optical fiber can transmit due to SBS (Stimulated Brouillin Scattering) constraints. In addition, the two-way Rayleigh scattering raises the noise floor reducing the sensitivity of the receiver, and increasing the transmitter laser power requirement.

One solution to the foreseen problem of using a long optical delay line in the LO path, is to separate the two functions, error correction & LO mixing heterodyne detection, while optimizing each one without detrimental effects to the other.

Figure 5:
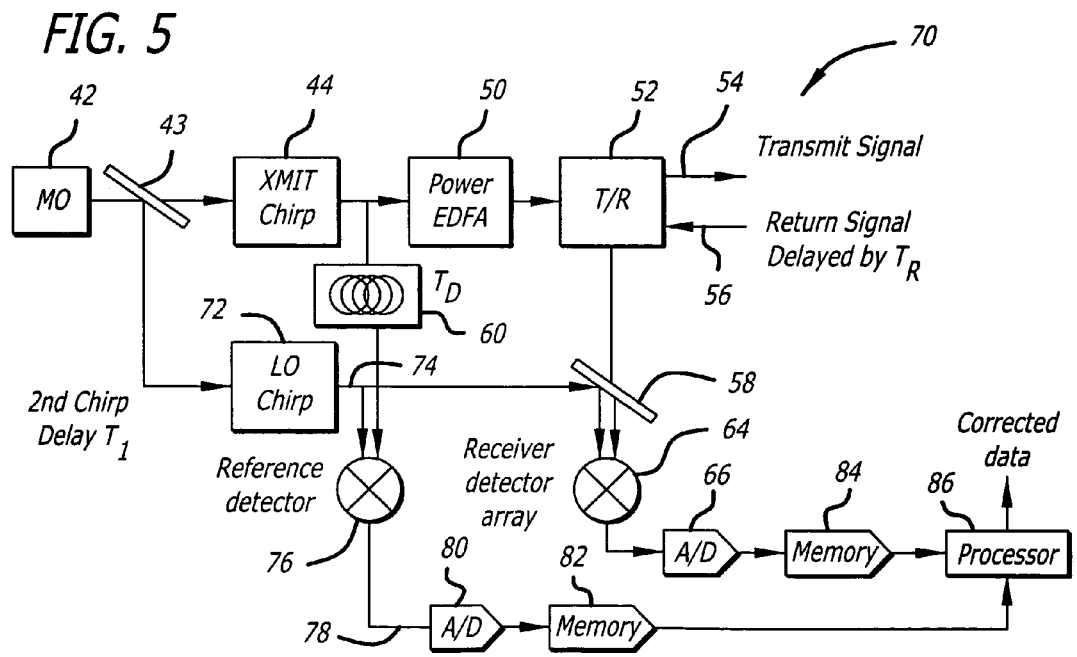
FIG. 5 is a simplified block diagram of an alternate embodiment of a coherent ladar system designed in accordance with the teachings of the present invention.

FIG. 5 is a simplified block diagram of an alternate embodiment of a coherent ladar system 70 designed in accordance with the teachings of the present invention. The ladar system 70 includes a MO laser 42 that generates a laser signal which is split by a fiber splitter 43 into two signals: one for the transmit signal and a second for the LO reference. The transmit signal travels a path identical to the embodiment of FIG. 3. A waveform modulator 44 modulates the signal (in the illustrative embodiment, the waveform is an LFM chirp), which is amplified by a power amplifier 46 and transmitted through transmit/receive optics 52. The laser return signal 56 is received by the transmit/receive optics 52 and directed to a beam splitter 58 where the return is mixed with a LO reference signal and detected by a receiver detector 64 (a detector array is shown in the illustrative embodiment).

In this embodiment, the LO function is obtained by creating a new secondary chirp that is electronically delayed approximately the target round trip time. As shown in FIG. 5, the signal from the MO laser 42 is modulated by a second waveform modulator 72 to generate an LO reference signal 74 similar to the signal generated by the first (transmit) waveform modulator 44, but delayed by a time $T_1$ that is approximately equal to the target round trip time $T_R$. The return signal 56 and the LO signal 74 are mixed at the beam splitter 58 creating a beat signal that is then detected by the receiver detector 64. The LO chirp is delayed in order to maintain a low beat frequency allowing for relatively low bandwidth, that can be digitized by a low speed A/D 66. Since the LO signal is different (though similar) than the transmitted one, the phase noise of the two does not vanish when the two chirps coincide in time. A second reference channel is used to cancel the phase noise due to both the MO phase jitter and non-linear chirp.

The reference channel is generated by sampling and storing the transmitted chirp waveform using an optical delay line 60 of delay time $T_D$ approximately equal to the target round trip time $T_R$. The sampled and delayed transmitter signal is then heterodyne detected by a second detector 76 using the same LO signal 74 used for the target signal detection, creating a reference signal 78 to be used for phase error correction. The reference beat signal is also of relatively low bandwidth and can be digitized by a second relatively low speed A/D 80.

The error correction of the transmitter phase noise and chirp non-linearity is accomplished by multiplying the received return signal with the phase error correction reference signal 78 and keeping only the difference phase terms. In the illustrative embodiment, the mixing of the two signals is done digitally. The output of the first detector 64 (containing the laser return) is digitized by the A/D 66 and saved in memory 84. The output of the second detector 76 (containing the phase correction reference signal) is digitized by the A/D 80 and saved in memory 82. The two signals can then be digitally mixed by a processor 86. The signals can also be combined using other methods without departing from the scope of the present teachings.

When this operation is done, any effect due to the secondary LO chirp modulation is eliminated, and the final phase term is the same as that of the previous embodiment shown in FIG. 3. The formulation showing this is given by the following derivation.

Assume that the phase of the target signal is represented by $\theta_{sig}$, and the phase of the reference channel is given by $\theta_{ref}$, and that the modulation functions are given by $\text{chirp}_r(t)$ and $\text{chirp}_t(t)$ representing a linear chirp given by:

$$\text{chirp}(t) = \frac{\mu}{2}t^2 \text{ where } \mu \text{ is the chirp slope} \quad [34]$$

$$\theta_{sig} = \omega t + chrp_r(t - T_1) + \varphi(t) - \omega(t - T_R) - chrp_t(t - T_R) - \quad [35]$$
$$\varphi(t - T_R)$$
$$= \omega T_R + \{chrp_r(t - T_1) - chrp_t(t - T_R)\} + \varphi(t) - \varphi(t - T_R)$$

$$\theta_{ref} = \omega t + chrp_r(t - T_1) + \varphi(t) - \omega(t - T_D) - chrp_t(t - T_D) - \quad [36]$$
$$\varphi(t - T_D)$$
$$= \omega T_D + \{chrp_r(t - T_1) - chrp_t(t - T_D)\} + \varphi(t) - \varphi(t - T_D)$$

Multiplying the two signals together and selecting only the difference phase term (done by frequency filtering) results in:

$$\theta_{sig} - \theta_{ref} = \omega(T_R - T_D) + chrp_r(t - T_1) - chrp_t(t - T_R) - chrp_r(t - T_1) + chrp_t(t - T_D) + \phi(t) - \phi(t - T_R) - \phi(t) + \phi(t - T_D) \quad [37]$$

Replacing for $\tau = T_R - T_D$ and t with $t + T_R$ gives:

$$\theta_{sig} - \theta_{ref} = \omega(T_R - T_D) + -chrp_t(t - T_R) + chrp_t(t - T_D) + \quad [38]$$
$$\varphi(t) - \varphi(t - T_R) - \varphi(t) + \varphi(t - T_D)$$
$$= \omega \tau + chrp_t(t + \tau) - chrp_t(t) + \varphi(t + \tau) - \varphi(t)$$

Eqn. 37 is of the same form as Eqn. 22, where one would obtain for the mixing of a target signal with a delayed version of itself as the LO, with a net delay mismatch of $\tau$. Observe how any phase errors introduced by the second "LO" chirp are perfectly cancelled.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A ladar system comprising:
a laser transmitter for generating a first laser signal;
optics for receiving a second signal that is a reflected version of said first laser signal;
an optical delay line adapted to generate a third signal from said first laser signal, wherein said third signal is a delayed version of said first laser signal, said third signal being delayed by a time $T_D$ that reduces a relative time difference between said second and third signals such that phase errors are less than a predetermined level, said time $T_D$ being approximately equal to a round trip time $T_R$ of said second signal;
a mechanism for mixing said third signal with said second signal;
a first detector adapted to detect said second signal mixed with said third signal and output a first output signal;
a beam splitter for generating a fourth signal from said first signal;
a second detector adapted to detect said third signal mixed with said fourth signal and output a second output signal;
a first waveform modulator adapted to modulate said first signal, said first waveform modulator being adapted to generate a first linear frequency modulated chirp waveform; and
a second waveform modulator adapted to modulate said fourth signal, said second waveform modulator being adapted to generate a second liner frequency modulated chirp waveform, said second chirp waveform being delayed by a time $T_1$ approximately equal to said time round trip time $T_R$ to provide an error signal; and
a processor for using said error signal to provide a corrected output signal.

2. The invention of claim 1 wherein said phase errors include phase errors caused by instabilities in said laser transmitter.

3. The invention of claim 1 wherein said phase errors include phase errors caused by nonlinearities in said first waveform modulator.

4. The invention of claim 1 wherein said mechanism is adapted to mix said first and second output signals.

5. The invention of claim 4 wherein said mechanism includes a processor adapted to digitally multiply said first and second output signals.

6. A ladar system comprising:
a laser transmitter for generating a first laser signal;
optics for receiving a laser return signal that is a reflected version of said first laser signal;
an optics delay line adapted to generate a phase correction signal from said first laser signal, wherein said phase correction signal is a delayed version of first signal, said phase correction signal being delayed by a time $T_D$, said time $T_D$ being approximately equal to a round trip time of said laser return signal;
a mechanism for splitting said first laser signal to generate a reference signal;
a first detector adapted to detect said laser return signal mixed with said reference signal and output a first output signal;
a second detector adapted to detect said phase correction signal mixed with said reference signal and output a second output signal;
a mechanism for mixing said first and second output signals;
a first waveform modulator adapted to modulate said first signal; and
a second waveform modulator adapted to modulate said reference signal, said second waveform modulator adapted to generate a waveform identical to a waveform generated by said first waveform modulator, but delayed by a time $T_1$, said lime $T_1$ being approximately equal to a round trip time of said laser return signal.

7. The invention of claim 6 wherein said first waveform modulator is adapted to generate a linear frequency modulated chirp waveform.

8. The invention of claim 7 wherein said second waveform modulator is adapted to generate a linear frequency modulated chirp waveform.

9. A method for correcting phase errors in a coherent ladar system including the steps of:
  generating a first laser signal;
  receiving a laser return signal that is a reflected version of said first laser signal;
  generating a first reference signal from said first laser signal, wherein said reference signal is a delayed version of said first laser signal;
  mixing said laser return signal with said reference signal to provide a first output signal;
  generating a local oscillator reference signal similar to said first signal but delayed by a time $T_1$ that is approximately equal to the target round trip time $T_R$;
  mixing said local oscillator reference signal with said first reference signal to provide an error signal; and
  using said error signal to provide a corrected output signal.

10. The invention of claim 9 wherein said method further includes choosing a time $T_D$ that reduces a relative time difference between said laser return signal and said reference signal such that phase errors are less than a predetermined level.

11. The invention of claim 10 wherein said time $T_D$ is approximately equal to a round trip time of said laser return signal.

* * * * *